United States Patent [19]

Boguslavsky et al.

[11] 3,912,480

[45] Oct. 14, 1975

[54] GLASS ANNEALING PROCESS

[76] Inventors: Igor Alexandrovich Boguslavsky, ulitsa Nametkina, 19, korpus 2, kv. 27; Serafin Maximovich Brekhovskikh, Orlikov pereulok, 6/1, kv. 69; Vladimir Alexeevich Abrosimov, ulitsa Gastello, 39, kv. 59; Julia Nikolaevna Viktorova, Lyalin pereulok, 24/26, kv. 32, all of Moscow, U.S.S.R.

[22] Filed: Jan. 2, 1974

[21] Appl. No.: 429,823

Related U.S. Application Data

[63] Continuation of Ser. No. 215,887, Jan. 6, 1972, abandoned.

[52] U.S. Cl. .................. 65/30; 65/35; 65/99 A; 65/119; 264/70
[51] Int. Cl.² ............... C03C 17/22; C03B 35/00; C03B 25/00
[58] Field of Search ............ 264/69, 70; 65/30, 35, 65/65 A, 99 A, 114, 115, 117, 119

[56] References Cited

UNITED STATES PATENTS

| | | | |
|---|---|---|---|
| 3,447,480 | 6/1969 | Bodine | 264/70 X |
| 3,447,587 | 6/1969 | Bodine | 264/70 X |
| 3,630,705 | 12/1971 | Owa | 65/99 A |
| 3,632,321 | 1/1972 | Plumat | 65/30 |

*Primary Examiner*—Robert L. Lindsay, Jr.
*Attorney, Agent, or Firm*—Waters, Schwartz & Nissen

[57] ABSTRACT

A process for improving the optical properties of glass comprises heating glass to its annealing temperature, holding it at this temperature in a molten salt with a viscosity of not more than 100cp and subjecting it simultaneously to the influence of mechanical vibrations at audio frequency ranging within 20–18000 cps and transmitted to the molten salt.

1 Claim, No Drawings

GLASS ANNEALING PROCESS

This application is a continuation application of Ser. No. 215,887, filed Jan. 6, 1972 now abandoned.

The present invention relates to a glass annealing process and is suitable for fine firing of optical glass of various compositions and for partial firing of complex-shaped tempered glass articles to improve their optical and strength properties.

Known in the prior art is a glass annealing process which involves heating glass to its annealing temperature, holding at this temperature in a molten salt, such as potassium nitrate, followed by gradual cooling to normal temperature (see, for instance, an article published in "Glastechnische Berichte", Bl. 34, N 11, 1961, S. 529–534).

Due to the high annealing temperature of glass its cooling lasts for several weeks.

Attempts have been made to reduce the duration of the glass annealing process and to decrease the annealing point by subjecting the molten salt bath in which the glass is immersed to the influence of mechanical vibrations at ultrasonic frequency.

This, however, did not yield the desired results as the ultrasonic vibrations were almost completely absorbed by the molten salt and were not transmitted to the glass being treated.

Owing to this, relaxation of internal stresses in the glass was not speeded up and the annealing point remained unchanged.

In addition prolonged holding of certain glass compositions at a high annealing temperature and during the cooling operation results in a heterogeneous structure in glass and adversely affects its optical characteristics.

It is an object of the present invention to provide a glass annealing process which would enable the annealing temperature to be decreased.

Another object of this invention is to develop a glass annealing process which would allow reducing the annealing time.

Still another object of this invention is to provide a glass annealing process ensuring enhancement of glass quality.

The specified and other objects are achieved by the fact that in the process of annealing glass by heating it to its annealing termperature, holding it at this temperature in molten salt and subjecting it simultaneonsly to mechanical vibrations followed by cooling, the improvement to this invention comprises subjecting glass during the holding operation to the influence of mechanical vibrations at 20–18000 cps audio frequency, transmitted to a molten salt with a viscosity not more than 100 cp.

The essence of the proposed invention lies in the following.

As shown by the investigations conducted by us, mechanical vibrations at audio frequency result in relaxation of the glass structure and in more intense diffusion processes. This is attributable to the interaction of internal stresses existing in glass and those developed under the influence of vibrations. All this is prone to accelerate relaxation of the internal stresses in the glass being treated and to decrease its annealing temperature. To ensure this it is necessary to rule out considerable loss of energy which occurs when the vibrations pass through the molten salt, increasing thereby the glass frequency rate.

The loss of energy of acoustic oscillations in molten salts depends on their frequency and the viscosity of the molten salt.

The most favorable conditions are created with the glass oscillating at resonance frequency.

Vibration frequency depends on the size and geometry of the glass articles ranging for the majority of such articles within 20–18000 cps, i.e. within the audio frequency range.

Depending on the glass composition and annealing temperature use may be made of the following molten salts whose viscosity approaches that of water.

| | |
|---|---|
| $KNO_3$ | with a melting point of 370°C |
| $AgNO_3$ | with a melting point of 208°C |
| 69.6% $LiCl$ / 30.4% $KCl$ | with a melting point of 348°C |
| 42% $LiCl$ / 58% $K_2SO_4$ | with a melting point of 420°C |
| 53.8% $Li_2SO_4$ / 29.7% $KCl$ / 16.5% $NaCl$ | with a melting point of 430°C |

For the purpose of giving those skilled in the art a better understanding of the invention let us consider the process of annealing borosilicate glass with a glass-transition temperature ($T_g$) of 620° and sodium-calcium silicate glass with a glass-transition temperature ($T_g$) of 540° and with internal stresses amounting to 50–150 nm/cm. For annealing glass according to the proposed process a glass bank in the form of a rectangular plate measuring 500×500×35 mm, secured in a supporting frame, is placed into a resistance batcl furnace, where the glass is preheated to an annealing temperature.

Next the glass is conveyed into a salt bath containing molte salt heated to the same temperature as the glass proper. Vibrations at 20–18000 cps are produced by means of a 1.5 kW generator immersed in the molten salt. From the generator vibrations are transmitted to the glass, passing through the molten salt.

Holding time, when the vibrations are used, depends on the requisite degree of annealing of the glass being processed.

After the holding operation which is effected at the glass annealing temperature the generator is cut off, as the internal stresses existing in glass have already been relieved and the temperature of the molten salt is gradually reduced to preclude the possibility of secondary stresses. Gradual cooling is carried out with the aid of a programmed temperature control system and lasts for 6–10 hr.

Tabulated below are the actual parameters obtained in annealing glass conforming to the proposed process depending on the glass composition and the kind of molten salt used.

As appears from Examples 5 and 6 of the Table molten salts with a viscosity of more than 100 cp are unsuitable for effective annealing. Depending on the relative dimensions of the blanks to be annealed and of the salt bath, a large number of glass blanks can be subjected to annealing at one and the same time.

As is seen from the description and the data cited in the Table, the process proposed herewith enables the annealing temperature to be decreased by more than 20°C.; it also makes it possible to reduce substantially the annealing time bringing it to 12–110 hr., a feature resulting in enhanced optical and strength properties of annealed glass.

Table

| Example No | Glass to be annealed | Molten salt | Generator frequency (cps) | Viscosity of molten salt (cp) | Annealing temperature, °C | Annealing time, hr |
|---|---|---|---|---|---|---|
| 1. | Borosilicate glass | ZnCl$_2$ | 20 | 10 | 580 | 50 |
| 2. | Ditto | Ditto | 50 | 25 | 560 | 30 |
| 3. | Ditto | Ditto | 100 | 40 | 550 | 12 |
| 4. | Ditto | Ditto | 250 | 60 | 530 | 60 |
| 5. | Sodium-calcium silicate glass | Ditto | 1000 | 80 | 500 | 80 |
| 6. | Ditto | Ditto | 10000 | 100 | 470 | 110 |
| 7. | Ditto | KNO$_3$ | 18000 | 1.8 | 450 | 60 |

What is claimed is:

1. A glass annealing process consisting of the following steps: heating the glass to its annealing temperature, holding the glass at this temperature in a molten salt bath with a viscosity of not more than 100 cp and subjecting the glass simultaneously during the holding step to the influence of mechanical vibrations at an audio frequency ranging within 20–18000 cps, generated within the molten salt bath, followed by cooling the glass.

* * * * *